R. P. PERRY.
METHOD OF MAKING CONSTRUCTION MATERIALS.
APPLICATION FILED NOV. 1, 1917.
1,288,159.
Patented Dec. 17, 1918.
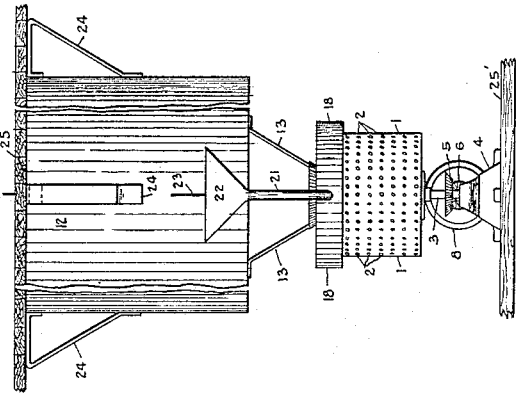
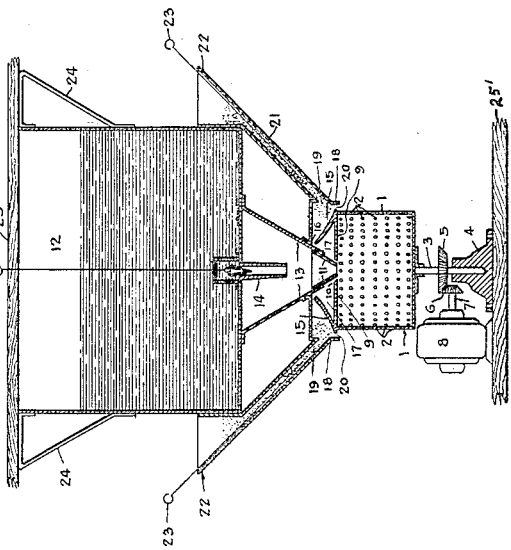
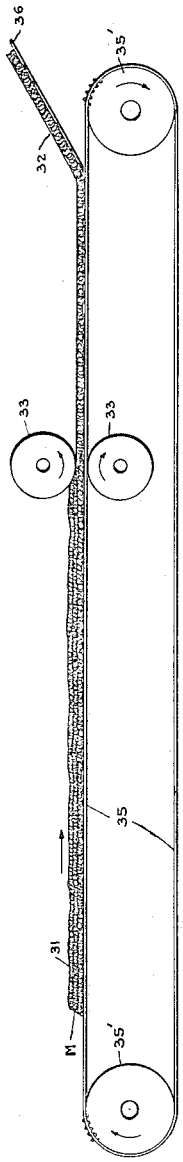
INVENTOR
Ray P. Perry
BY
Chas. W. Mortimer
ATTORNEY

UNITED STATES PATENT OFFICE.

RAY P. PERRY, OF UPPER MONTCLAIR, NEW JERSEY, ASSIGNOR TO THE BARRETT COMPANY, A CORPORATION OF WEST VIRGINIA.

METHOD OF MAKING CONSTRUCTION MATERIALS.

1,288,159.   Specification of Letters Patent.   Patented Dec. 17, 1918.

Application filed November 1, 1917. Serial No. 199,790.

*To all whom it may concern:*

Be it known that I, RAY P. PERRY, a citizen of the United States, residing at Upper Montclair, in the county of Essex and State of New Jersey, have invented certain new and useful Improvements in Methods of Making Construction Materials, of which the following is a specification.

My present invention comprises a method of making a waterproofed felt which does not involve the treatment of materials in the wet state and their subsequent drying and impregnation with a waterproofing material. According to my invention I make the waterproofed felt in a single operation of materials in the dry state. By my process the manufacture of waterproofed felts of the nature referred to is rendered simple and efficient and a very desirable product is thereby obtained.

In practising my invention I coat particles of fusible waterproofing material, preferably in the form of threads or filaments and preferably while such particles, as shot, or filaments, are in a soft, adherent condition, with a quantity of fibrous material in comminuted form, such as comminuted asbestos or mineral wool or any other fibrous material which can be brought to a fine state of subdivision and disintegration. The comminuted fibrous material when brought into contact with the particles of fusible waterproofing material, preferably of a bituminous material, such as pitch or asphalt, adhere to such particles due to the fact that the latter are in a soft, adherent condition. The mass of fiber-coated particles is thereafter gathered together and by means of heat or pressure, or preferably by means of both heat and pressure, is rolled or otherwise formed into a sheet. The action of the heat and pressure causes the materials to be intimately felted together. Where, as preferred, heat is used to form the sheet, the action of the heat causes the outer portions of the particles to become fused and the fused waterproofing material thereby functions to render the sheet waterproof and to cause the same to take on the appearance and character of a waterproofed sheet.

Referring to the drawing, wherein I have illustrated means for carrying out the process of my invention, Figure 1 is a view, partly in section and partly in elevation, and Fig. 2 is a similar view but at right angles to that shown in Fig. 1, of a device which may be used for practising the process of my invention; and Fig. 3 is a diagrammatic view showing the formation of the waterproofed felt of my invention.

While any type of extrusion, centrifugal, die-expression, or other type of shot or filament-forming machine may be employed for producing the particles of fusible waterproofing material used in my process, I prefer to use a device of the type illustrated in Figs. 1 and 2 of the drawing, wherein 1 is a substantially cylindrical container having one or more rows of apertures 2 substantially horizontally disposed. The container 1 is driven or rotated at any desired rate of speed by being mounted on the shaft 3 which is supported in the bearing 4. Fixedly mounted on the shaft 3, a small distance above the bearing 4, is a bevel gear 5 which meshes with a corresponding bevel gear 6, which is fixed on the shaft 7 of an electric or other motor 8. By setting the motor 8 in operation it is obvious that the container 1 will be rotated through the mediation of the bevel gears 5 and 6.

The container 1 has a substantially annular cover 9, which cover has a substantially central circular or other opening through which the particle-forming material is fed into the container. The particle-forming material, consisting of fusible waterproofing material, such as pitch or asphalt, is fed into the container 1 in a molten condition.

The molten particle-forming material is fed through the opening 10 into the container 1 by means of a funnel-shaped member 11 which is carried by the tank 12 by means of a strap or support 13. The tank 12 contains the fusible waterproofing material in a molten condition, the stop cock 14 controlling the amount and rate of flow. The funnel member extends into the opening 10 but does not touch the cover 9.

In order to provide the particles, such as shot or filaments, with the coating or covering of comminuted fibrous material, such as asbestos, I provide the annular inclined member 15, which is fixed to the cover 9 of the container 1 so as to rotate with the latter when it is rotated. The funnel member 11 passes through the opening 16 of the inclined member 15 so as to be slightly clear of the same. The air space 17 between the cover 9 and the inclined member 15 may serve as a heat insulating member to help maintain the particle-forming material in a molten condition. Or, if desired, the space 17 may be filled with a heat insulating material. Fastened to the funnel member 11, or maintained by any other means in a fixed position, is the annular inverted dish-shaped member 18, which coöperates with the member 15 to provide a chamber 19 which holds the material with which the waterproofing particles as extruded are covered. The covering material issues through the annular opening 20, through which it is fed by the action of the moving inclined annular member 15 which moves the powdered covering material toward the opening 20. The space 19 is supplied with the comminuted fibrous material by means of the tubes 21 which are provided with the funnels 22 and which may have rods 23 in the tubes to loosen up the comminuted material should it become clogged in the tubes.

The tank to which the funnel member 11 and the member 18 are attached is removably supported by brackets 24 under the shelf 25 or in any other convenient way.

In operation the molten particle-forming material is fed from the tank 12 through the valve or stop cock 14 into the funnel member 11 and thence into the container 1. The container 1 is rapidly rotated at any desired rate of speed by the meshing bevel gears 5 and 6 which are set in motion by the motor 8. Due to the centrifugal force of the rapidly rotating container 1 the molten particle-forming material is forced or extruded through the apertures 2 in the form of filaments if the temperature of the molten material is not far above its melting point, or in the form of shot if such temperature is substantially farther removed from such melting point. As these particles are extruded and while they are still in a soft, adherent condition, they are met by a shower of comminuted fibrous material issuing from the annular opening 20. The particles are thereby substantially covered with the comminuted fibrous material and the fiber-coated particles fall to the floor or other support 25′ where they are gathered together to be formed into sheets as will now be described.

A layer 31 of the material M consisting of the fiber-coated filaments is placed upon the support 35 in the form of an endless metal or other belt operated by the rotating rolls 35′, and the heated rolls 33 rotated by any suitable means are passed over the layer 31. The action of the heat of the heated rolls and the pressure exerted by the rolls cause the fiber-coated particles to be intimately matted or felted together to form the sheet 32 which is removed by the member 36. Any desired degree of pressure, depending upon the density desired in the finished product, may be employed. The action of the heat of the heated rolls causes the outer layers of particles to be fused, with the result that the fused waterproofing material permeates the interstices of the fibers and coats the same with the waterproofing material.

As a particle-forming material, I prefer to use the more pliant and flexible grades of asphalt, such as "blown" or "oxidized" asphalt, for example. While I may employ the fusible waterproofing material in the form of particles of any desired shape, I prefer to have such material in the form of shot or filaments. The filamentary form is particularly desirable since it facilitates the felting or matting together of the fiber-coated particles.

What I claim is:

1. In the process of manufacturing felts, the steps of adding fibrous material in comminuted form to a quantity of segregated particles of fusible waterproofing material while the particles are in a soft, adherent condition, and thereafter by pressure forming the mixed materials into sheet form.

2. In the process of manufacturing felts, the steps of adding dry fibrous material in comminuted form to a quantity of segregated particles of fusible waterproofing material while the particles are in a soft, adherent condition, and thereafter by pressure forming the mixed materials into sheet form.

3. In the process of manufacturing felts, the steps of adding dry fibrous material in comminuted form to a quantity of segregated particles of bituminous material while the particles are in a soft, adherent condition, and thereafter by pressure forming the mixed materials into sheet form.

4. In the process of manufacturing felts, the steps of adding dry fibrous material in comminuted form to a quantity of filaments of asphalt while the filaments are in a soft, adherent condition, and thereafter by pressure forming the mixed materials into sheet form.

5. In the process of manufacturing felts, the steps of coating particles of fusible waterproofing material with dry comminuted fibrous material while the particles are mechanically unsupported in a soft, adherent condition, and thereafter by pressure forming the fiber-coated particles into sheet form.

6. In the process of manufacturing felts, the steps of coating segregated particles of bituminous material with dry comminuted fibrous material while the particles are in a soft, adherent condition, and thereafter by pressure forming the fiber-coated particles into sheet form.

7. In the process of manufacturing felts, the steps of coating filaments of flexible asphaltic material with dry comminuted fibrous material while the filaments are in a soft, adherent condition, and thereafter by pressure forming the fiber-coated filaments into sheet form.

8. In the process of manufacturing felts, the steps of coating filaments of bituminous material with dry comminuted asbestos fibers while the filaments are in a soft, adherent condition, and thereafter by pressure forming the fiber-coated filaments into sheet form.

9. In the process of manufacturing felts, the steps of adding fibrous material in comminuted form to a quantity of segregated particles of fusible waterproofing material while the particles are in a soft, adherent condition, and thereafter by pressure and heat forming the mixed materials into sheet form.

10. In the process of manufacturing felts, the steps of adding fibrous material in comminuted form to a quantity of segregated particles of fusible waterproofing material, and thereafter by pressure forming the mixed materials into sheet form.

11. In the process of manufacturing felts, the steps of adding dry fibrous material in comminuted form to a quantity of segregated particles of fusible waterproofing material, and thereafter by pressure forming the mixed materials into sheet form.

In testimony whereof I affix my signature.

RAY P. PERRY.